(12) United States Patent
Pakkala et al.

(10) Patent No.: US 6,664,736 B1
(45) Date of Patent: Dec. 16, 2003

(54) METHOD AND SYSTEM FOR INDICATING BULB CIRCUIT FAILURE

(75) Inventors: William F. Pakkala, Owosso, MI (US); Steven C. Kekel, Grand Blanc, MI (US); Daniel A. Crawford, Burton, MI (US); Diana K. Voges, Fenton, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/207,364

(22) Filed: Jul. 29, 2002

(51) Int. Cl.⁷ ............................... B60Q 1/26; H01J 1/60
(52) U.S. Cl. ................... 315/80; 315/130; 340/438; 340/467
(58) Field of Search ............... 315/77, 79, 80, 315/130, 131; 340/438, 458, 467, 641, 642, 936

(56) References Cited

U.S. PATENT DOCUMENTS

| | | | |
|---|---|---|---|
| 3,956,733 A | * 5/1976 | Sakurai | 340/79 |
| 3,992,695 A | * 11/1976 | Mogi | 340/60 |
| 4,055,831 A | 10/1977 | Sakurai et al. | 340/80 |
| 4,068,216 A | 1/1978 | Brouwer et al. | 340/168 R |
| 4,320,383 A | 3/1982 | Lumbroso | 340/71 |
| 4,348,613 A | 9/1982 | Hormel et al. | 315/130 |
| 4,401,972 A | 8/1983 | Lupoli | 340/80 |
| 4,447,806 A | 5/1984 | Gundel et al. | 340/641 |
| 4,497,057 A | 1/1985 | Kato et al. | 371/29 |
| 4,661,717 A | 4/1987 | Nishioka | 307/106 S |
| 4,803,459 A | 2/1989 | Ta | 340/52 R |
| 5,075,672 A | 12/1991 | Stefanov | 340/641 |
| 5,760,613 A | 6/1998 | Pulvirenti et al. | 327/67 |
| 5,856,779 A | 1/1999 | Friday | 340/479 |
| 6,052,632 A | 4/2000 | Iihoshi et al. | 701/36 |
| 6,417,767 B1 | * 7/2002 | Carlson et al. | 340/467 |

* cited by examiner

Primary Examiner—Hoang V. Nguyen
(74) Attorney, Agent, or Firm—Jimmy L. Funke

(57) ABSTRACT

A method of monitoring faults in a vehicle bulb circuit including bulb and a fuse. The method includes detecting acceleration of the vehicle and comparing the acceleration of the vehicle to a limit. Based on the relationship of the acceleration to the limit, it is determined whether a fault exists in the bulb circuit. An indicator is activated in response to detecting a fault in the bulb circuit. A system for implementing the method is also disclosed.

22 Claims, 4 Drawing Sheets

METHOD AND SYSTEM FOR INDICATING BULB CIRCUIT FAILURE

TECHNICAL FIELD

This invention relates to a method and system for indicating bulb circuit failure.

BACKGROUND OF THE INVENTION

Vehicles such as automobiles and motorcycles employ a number of bulbs to signal driver actions to other drivers, pedestrians, etc. Such bulbs include brake lamps, turn signal lamps and reverse lamps. Such bulbs are part of a bulb circuit which typically includes a fuse for protecting the bulb circuit wiring in the event of a short circuit. Operators of vehicles are not always aware of a failure in the bulb circuit and thus do not know to obtain service for the bulb circuit.

SUMMARY OF THE INVENTION

Disclosed herein is a method of monitoring faults in a vehicle bulb circuit including a bulb and a fuse. The method includes detecting acceleration of the vehicle and comparing the acceleration of the vehicle to a limit. Based on the relationship of the acceleration to the limit, it is determined whether a fault exists in the bulb circuit. An indicator is activated in response to detecting a fault in the bulb circuit. A system for implementing the method is also disclosed.

The above described and other features are exemplified by the following figures and detailed description.

BRIEF DESCRIPTION OF THE DRAWINGS

Referring now to the Figures wherein like elements are numbered alike.

DESCRIPTION OF THE PREFERRED EMBODIMENT

Figure 1:
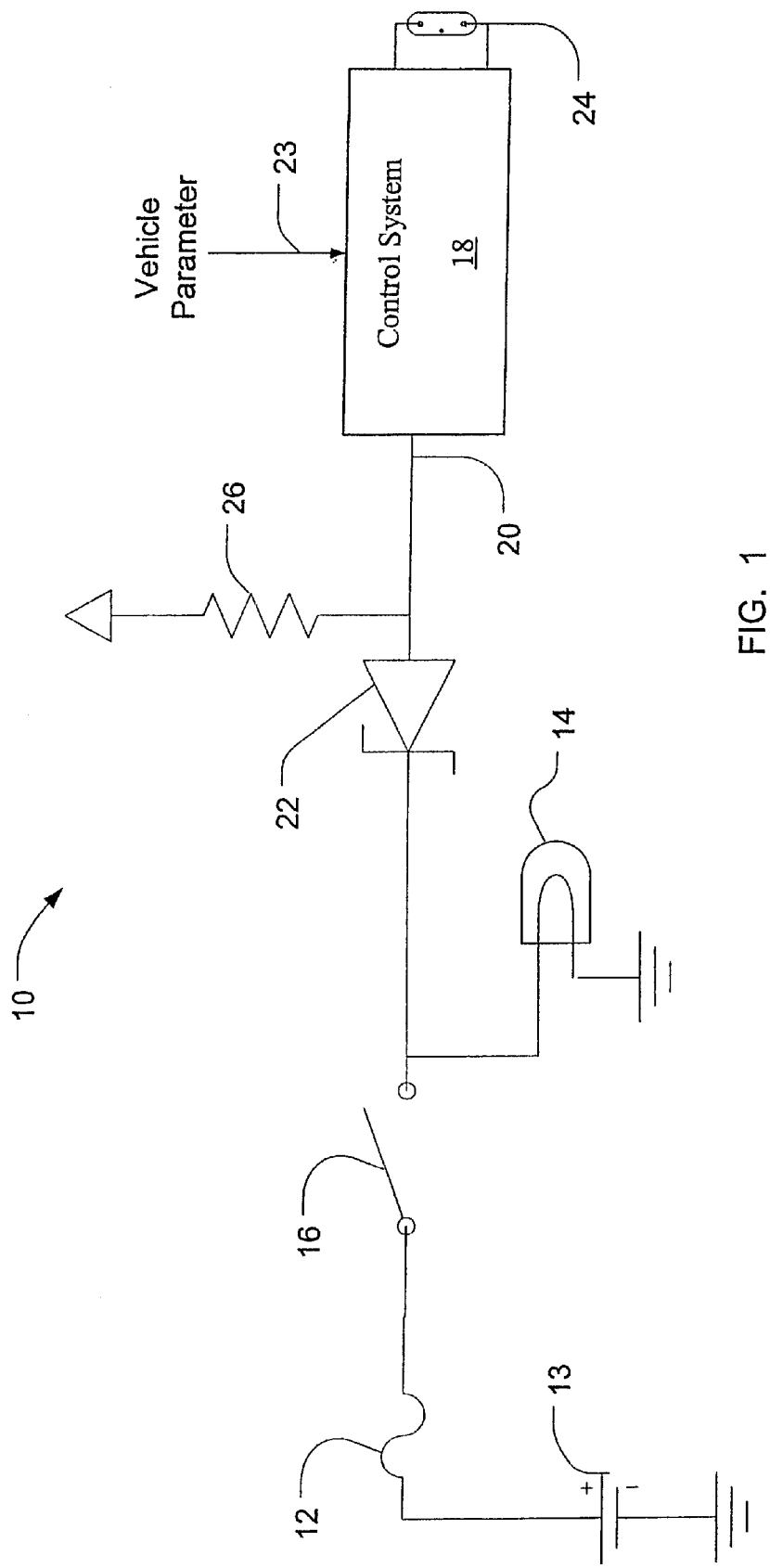
FIG. 1 is a schematic diagram of an exemplary system for indicating bulb circuit failure.

FIG. 1 is a schematic diagram of an exemplary system 10 for indicating bulb circuit failure. The bulb circuit includes a fuse 12 connected to a bulb 14. When switch 16 is closed, current flows from source 13, through fuse 12 to illuminate bulb 14. In an exemplary embodiment, bulb 14 is a brake indicator bulb in a vehicle (e.g., automobile, motorcycle) and switch 16 is closed when the brake pedal is depressed.

A control system 18 has an input terminal 20 connected to one terminal of bulb 14 through a diode 22. At least one sensor input terminal 23 receives vehicle parameters such as a speed signal from a speed sensor. The control system 18 may correspond to one or more existing vehicle control systems such as a cruise control system, anti-lock brake system, traction control system, drive train control system, chassis control system, etc. The control system includes an indicator 24 that may be illuminated when the control system detects a failure in the bulb circuit. In an exemplary embodiment, the control system 18 is a microprocessor-based control system executing steps described herein in response to a computer program in a storage medium.

Input terminal 20 is coupled to a voltage (e.g., 12 volts) through a resistance 26. In normal operation, when switch 16 is open, a current flows through resistor 26, through diode 22 and bulb 14. The current is small and thus bulb 14 does not light. The control system 18 receives a low voltage at input terminal 20. When switch 16 is closed, current flows from a voltage source 13, through fuse 12 to bulb 14 and has a magnitude sufficient to illuminate bulb 14. In this mode, the diode 22 is non-conductive. Thus, the voltage at input terminal 20 is a relatively high voltage.

Figure 2:
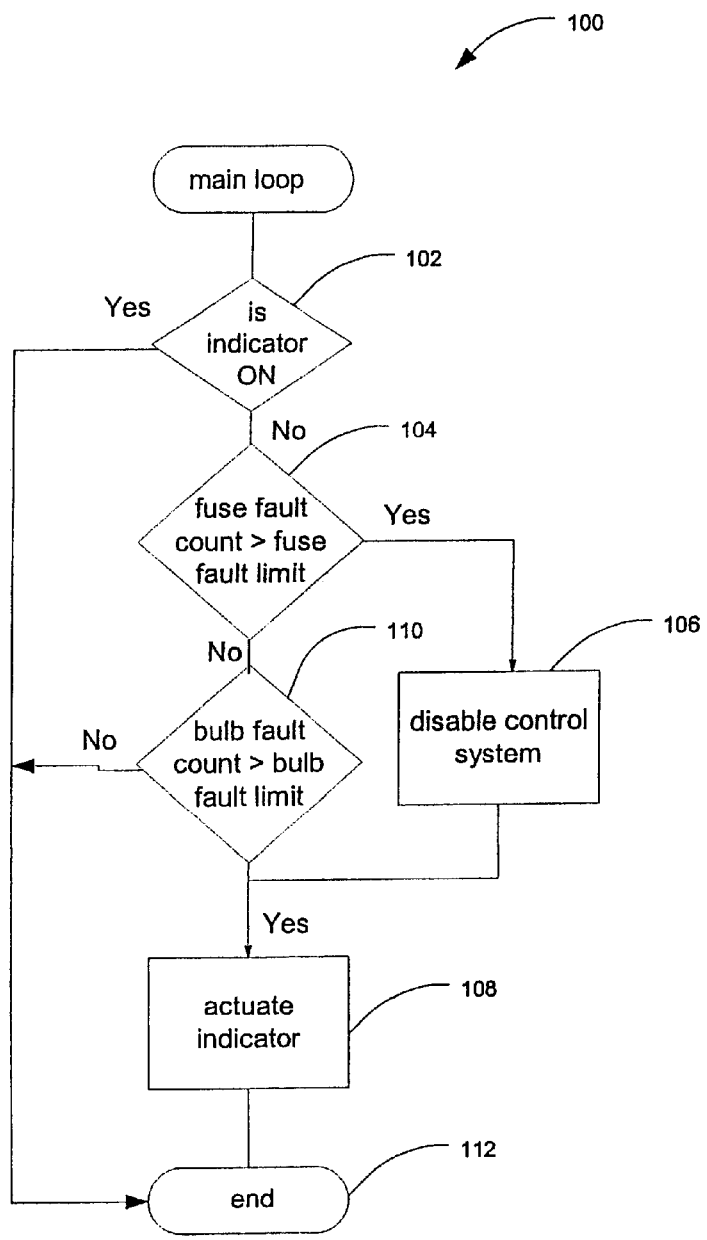
FIG. 2 is a flowchart of an exemplary main control loop.

Detection of failure of the bulb circuit is performed by the control system 18 by monitoring voltage at input terminal 20 along with other vehicle parameters. Operation of the control system 18 is described with reference to FIGS. 2–4. FIG. 2 is a flowchart of a main control loop 100 executed by the control system 18. The main control loop 100 may be executed periodically (e.g., once per millisecond). The process begins at step 102 where it is determined whether the control system 18 is active with the indicator 24 actuated. In this mode, the control system 18 is performing its primary function (e.g., cruise control) and thus does not monitor for faults in the bulb circuit. The control system may execute multiple processes simultaneously, but in the embodiment shown in FIG. 2, if the primary function is active, then the bulb circuit monitoring is not performed. In this scenario, the main loop ends at step 112.

If the primary function is not enabled at step 102, flow proceeds to step 104 where control system 18 determines if a fuse fault count has exceeded a fuse fault limit. As described in further detail herein, a fuse fault count is incremented or cleared depending on operating parameters of the vehicle (e.g., acceleration) and a signal indicative of whether the bulb 14 is illuminated. If the fuse fault count exceeds the fuse fault limit, flow proceeds to step 106 where the control system 18 is disabled. At step 108, the indicator 24 is actuated to indicate a fault. In the embodiment in FIG. 2, the indicator 24 is flashed with a period (e.g., 250 ms) to indicate a fault in the bulb circuit. Alternatively, the indicator could appear in a different color or an audible tone could be generated. The indicator 24 may also be actuated in a first manner to indicate a fuse fault and a second manner to indicate a bulb fault. For example, indicator 24 may be flashed in yellow to indicate a bulb fault and flashed in red to indicate a fuse fault.

If the fuse fault count has not exceeded the fuse fault limit at step 104, flow proceeds to step 110 where a bulb fault count is compared to a bulb fault limit. As described in further detail herein, a bulb fault count is incremented or cleared depending on operating parameters of the vehicle (e.g., acceleration) and a signal indicative of whether the bulb 14 is illuminated. If the bulb fault count exceeds the bulb fault limit, flow proceeds to step 108 where the indicator 24 is activated to indicate a fault in the bulb circuit. If the bulb fault count does not exceed the bulb fault limit, the main loop 100 terminates at step 112. The main loop may be executed periodically (once per second) to continuously monitor bulb circuit faults.

Figure 3:
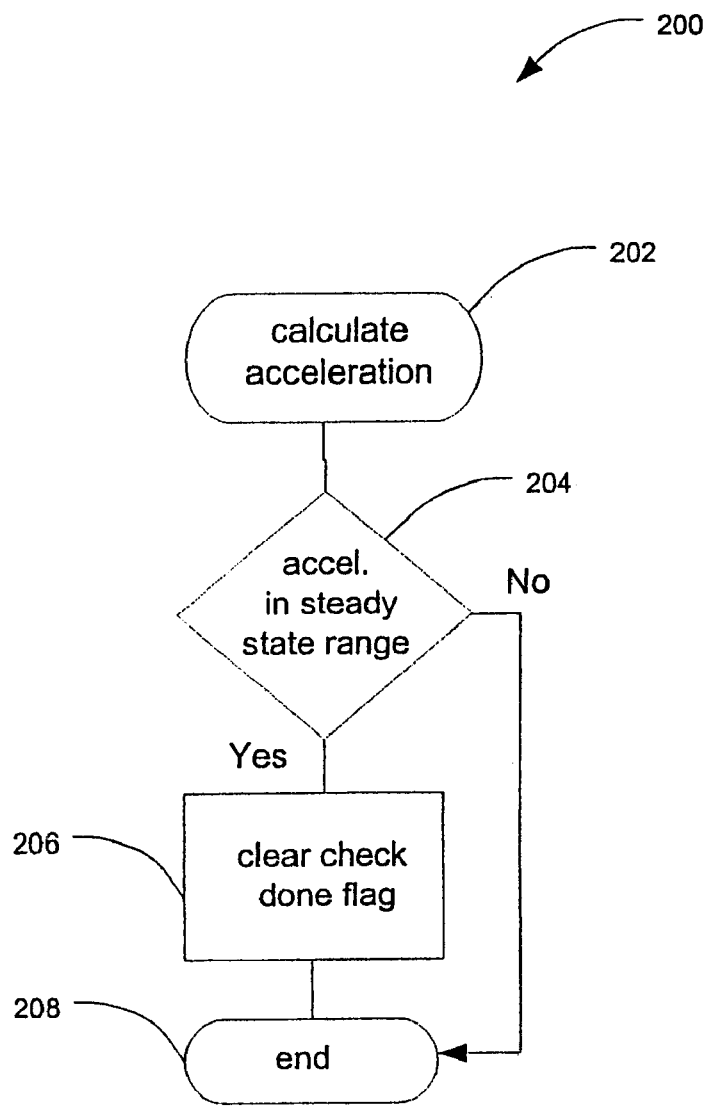
FIG. 3 is a flowchart of an exemplary process for setting a check done flag.

FIG. 3 depicts an exemplary process 200 for setting the status of a check done flag. The process is periodically implemented by control system 18 (e.g., every 125 ms). The check done flag indicates that the monitoring of bulb circuit faults has been performed. The process begins at step 202 where the acceleration of the vehicle is determined. The acceleration may be obtained from a sensor (e.g., accelerometer) or computed from another value (e.g., derivative of speed signal). At step 204, the acceleration is compared to a steady state range. If the acceleration is within a range of moderate deceleration (e.g., −1 mph/sec) and moderate acceleration (e.g., 0.996 mph/sec), then the vehicle is traveling at a substantially uniform speed and the check done flag is cleared at step 206 and the process terminates at step 208. If the vehicle is not traveling at a substantially uniform speed as indicated by the acceleration, then the process ends at step 208 without clearing the check done flag. The effect of process 200 is that a period of uniform acceleration clears the check done flag. As discussed further with respect to FIG. 4, this allows the control system to monitor bulb circuit failure the next time the vehicle experiences significant positive or negative acceleration.

Figure 4:
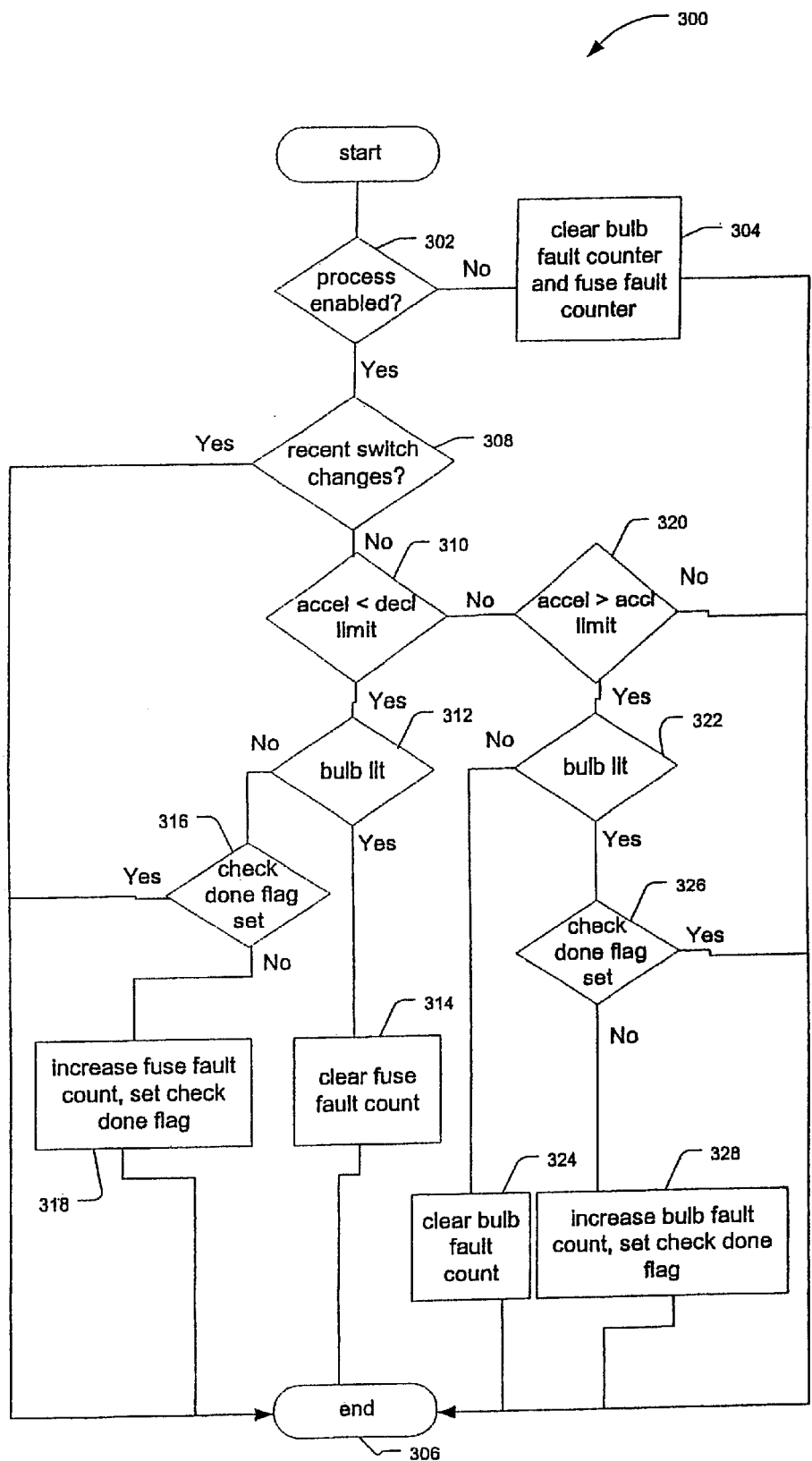
FIG. 4 is a flowchart of an exemplary process for monitoring faults in a bulb circuit.

FIG. 4 depicts an exemplary bulb circuit monitoring process 300 implemented by control system 18. The process is implemented periodically (e.g., every 16 ms). The process begins at step 302 where it is determined whether bulb circuit fault monitoring is enabled. Whether the bulb circuit monitoring function is enabled may be a customer-specified option. If the bulb circuit monitoring function is not enabled, then flow proceeds to step 304 where the bulb fault count and the fuse fault count are cleared and the process terminates at step 306.

If the bulb circuit monitoring process is enabled, flow proceeds to step 308 where it is determined if there have been recent changes in any switch inputs to control system 18. Switch inputs include, but are not limited to, inputs such as switch 16. For example, if control system 18 is a cruise control unit, then switch inputs include brake switch 16 along with other cruise control inputs such as set, resume, etc. If recent changes are detected (e.g. change of state within the past 16 ms) at step 308, the process terminates at step 306. This allows the control system 18 to respond to user inputs before executing the bulb circuit monitoring process.

If no recent switch changes are detected, flow proceeds to step 310 where the vehicle acceleration is compared to a deceleration limit. If the acceleration is less than the deceleration limit, this indicates that the vehicle is experiencing a significant deceleration. If so, at step 312 it is determined whether bulb 14 has been illuminated. This is determined by monitoring the voltage at input terminal 20. When significant negative acceleration is detected, this indicates that switch 16 is closed (i.e., brakes are applied). If fuse 12 is operational, diode 22 will be placed in a non-conductive state and a high voltage will be at input terminal 20. In FIG. 4, a high voltage at input terminal 20 indicates that the bulb 14 has been illuminated. In this situation, flow proceeds to step 314 where fuse fault counter is reset to zero and the process ends at step 306.

If at step 312 it is determined that bulb 14 has not been illuminated, flow proceeds to step 316 where the status of the check done flag is detected. If the check done flag indicates that the bulb circuit has already been monitored during this period of deceleration, the process terminates at step 306. Thus, the check done flag prevents the fuse fault count from being incremented more than once during any period of deceleration.

If the check done flag is not set at step 316, flow proceeds to step 318 where the fuse fault count is incremented and the check done flag is set. Since the check done flag is set, the fuse fault count will not be incremented further during the same period of deceleration.

If at step 310 significant deceleration is not detected, flow proceeds to step 320 where it is determined if the acceleration exceeds an acceleration threshold. If the acceleration is greater than the acceleration limit, this indicates that the vehicle is experiencing a significant acceleration indicating that the bulb 14 should not be illuminated. If so, at step 322 it is determined whether bulb 14 has been illuminated. This is determined by monitoring the voltage at input terminal 20. When significant positive acceleration is detected, this indicates that switch 16 is open (e.g., brakes are not applied). If bulb 14 is operational, diode 22 will be placed in a conductive state and a low voltage will be at input terminal 20. In this situation, the low voltage at input terminal 20 causes step 322 to be answered in the negative and flow proceeds to step 324 where the bulb fault count is reset to zero and the process ends at step 306.

If the bulb 14 is burnt out, there is no current path through diode 22 and a high voltage will be present at input terminal 20. In this situation, flow proceeds to step 326 where the status of the check done flag is detected. If the check done flag indicates that the bulb circuit has already been monitored during this period of acceleration, the process terminates at step 306. Thus, the check done flag prevents the bulb fault count from being incremented more than once during any period of acceleration.

If the check done flag is not set at step 326, flow proceeds to step 328 where the bulb fault count is incremented and the check done flag set. Since the check done flag is set, the bulb fault count will not be incremented further during the same period of acceleration.

As discussed with reference to FIG. 2, the bulb fault count and the fuse fault count are used in the main control loop 100. If either the bulb fault count or the fuse fault count exceeds respective limits, the indicator 24 is actuated to notify the operator of a fault in the bulb circuit.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of monitoring faults in a vehicle bulb circuit including a bulb and a fuse, the method comprising:
   detecting acceleration of the vehicle;
   comparing the acceleration of the vehicle to a limit;
   if the acceleration has a predefined relationship with respect to the limit, determining whether a fault exists in the bulb circuit; and
   activating an indicator in response to detecting a fault in the bulb circuit.

2. The method of claim 1 wherein:
   said acceleration is negative and the limit is a deceleration limit, said comparing includes comparing the negative acceleration to the deceleration limit;
   if the negative acceleration is less than the deceleration limit, determining a state of a bulb illumination signal and incrementing a fuse fault count if the bulb illumination signal is in a first state;
   said activating the indicator being responsive to the fuse fault count.

3. The method of claim 2 further comprising:
   clearing the fuse fault count if the bulb illumination signal is in a second state.

4. The method of claim 2 wherein:

said activating the indicator includes comparing the fuse fault count to a fuse fault limit and activating the indicator when the fuse fault count exceeds the fuse fault limit.

5. The method of claim 2 wherein:

said incrementing the fuse fault count is dependent on a check done flag, the check done indicative of whether said determining whether a fault exists in the bulb circuit has been performed during the acceleration, said incrementing being prevented if said check done flag is set.

6. The method of claim 1 wherein:

said acceleration is positive and the limit is an acceleration limit, said comparing includes comparing the positive acceleration to the acceleration limit;

if the positive acceleration is greater than the acceleration limit, determining a state of a bulb illumination signal and incrementing a bulb fault count if the bulb illumination signal is in a second state;

said activating the indicator being responsive to the bulb fault count.

7. The method of claim 6 further comprising:

clearing the bulb fault count if the bulb illumination signal is in a first state.

8. The method of claim 6 wherein:

said activating the indicator includes comparing the bulb fault count to a bulb fuse fault limit and activating the indicator when the bulb fault count exceeds the bulb fault limit.

9. The method of claim 6 wherein:

said incrementing the bulb fault count is dependent on a check done flag, the check done indicative of whether said determining whether a fault exists in the bulb circuit has been performed during the acceleration, said incrementing being prevented if said check done flag is set.

10. A method of monitoring faults in a vehicle bulb circuit including a bulb and a fuse, the method comprising:

detecting acceleration of the vehicle;

if said acceleration is negative, comparing the negative acceleration to a deceleration limit; if the negative acceleration is less than the deceleration limit determining a state of a bulb illumination signal; and, incrementing a fuse fault count if the bulb illumination signal is in a first state;

if said acceleration is positive, comparing the positive acceleration to an acceleration limit; if the positive acceleration is greater than the acceleration limit determining a state of a bulb illumination signal; incrementing a bulb fault count if the bulb illumination signal is in a second state;

activating an indicator in response to one of the bulb fault count and the fuse fault count.

11. The method of claim 10 further comprising:

if said acceleration is negative, clearing the fuse fault count if the bulb illumination signal is in the second state.

12. The method of claim 10 further comprising:

if said acceleration is positive, clearing the bulb fault count if the bulb illumination signal is in the first state.

13. A system for monitoring faults in a vehicle, the system comprising:

a bulb circuit including a bulb and a fuse;

a control system having an input terminal coupled to said bulb; and, an indicator coupled to said control system;

said control system, comparing acceleration of the vehicle to a limit; if the acceleration has a predefined relationship with respect to the limit, determining whether a fault exists in the bulb circuit; and activating said indicator in response to detecting a fault in the bulb circuit.

14. The system of claim 13 wherein:

said acceleration is negative and the limit is a deceleration limit, said control system compares the negative acceleration to the deceleration limit;

if the negative acceleration is less than the deceleration limit, said control system determines a state of a bulb illumination signal at said input terminal;

said control system incrementing a fuse fault count if the bulb illumination signal is in a first state and activating said indicator in response to the fuse fault count.

15. The system of claim 14 wherein:

said control system clears the fuse fault count if the bulb illumination signal is in a second state.

16. The system of claim 14 wherein:

said control system compares the fuse fault count to a fuse fault limit and activates said indicator when the fuse fault count exceeds the fuse fault limit.

17. The system of claim 14 wherein:

said control system increments the fuse fault count in response to a check done flag, the check done flag indicative of whether said control system has determined whether a fault exists in the bulb circuit during the acceleration, the incrementing of the fuse fault count being prevented if said check done flag is set.

18. The system of claim 13 wherein:

said acceleration is positive and the limit is an acceleration limit, said control system compares the positive acceleration to the acceleration limit;

if the positive acceleration is greater than the acceleration limit, said control system determines a state of a bulb illumination signal;

said control system incrementing a bulb fault count if the bulb illumination signal is in a second state and activating said indicator in response to the bulb fault count.

19. The system of claim 18 wherein:

said control system clears the bulb fault count if the bulb illumination signal is in a first state.

20. The system of claim 18 wherein:

said control system compares the bulb fault count to a bulb fuse fault limit and activates said indicator when the bulb fault count exceeds the bulb fault limit.

21. The system of claim 18 wherein:

said control system increments the bulb fault count is response to a check done flag, the check done flag indicative of whether said control system has determined whether a fault exists in the bulb circuit during the acceleration, the incrementing of the bulb fault count being prevented if said check done flag is set.

22. The system of claim 18 wherein:

said control system is a vehicle cruise control system.

* * * * *